(No Model.)
J. PLEUKHARP.
Table.
No. 239,838. Patented April 5, 1881.
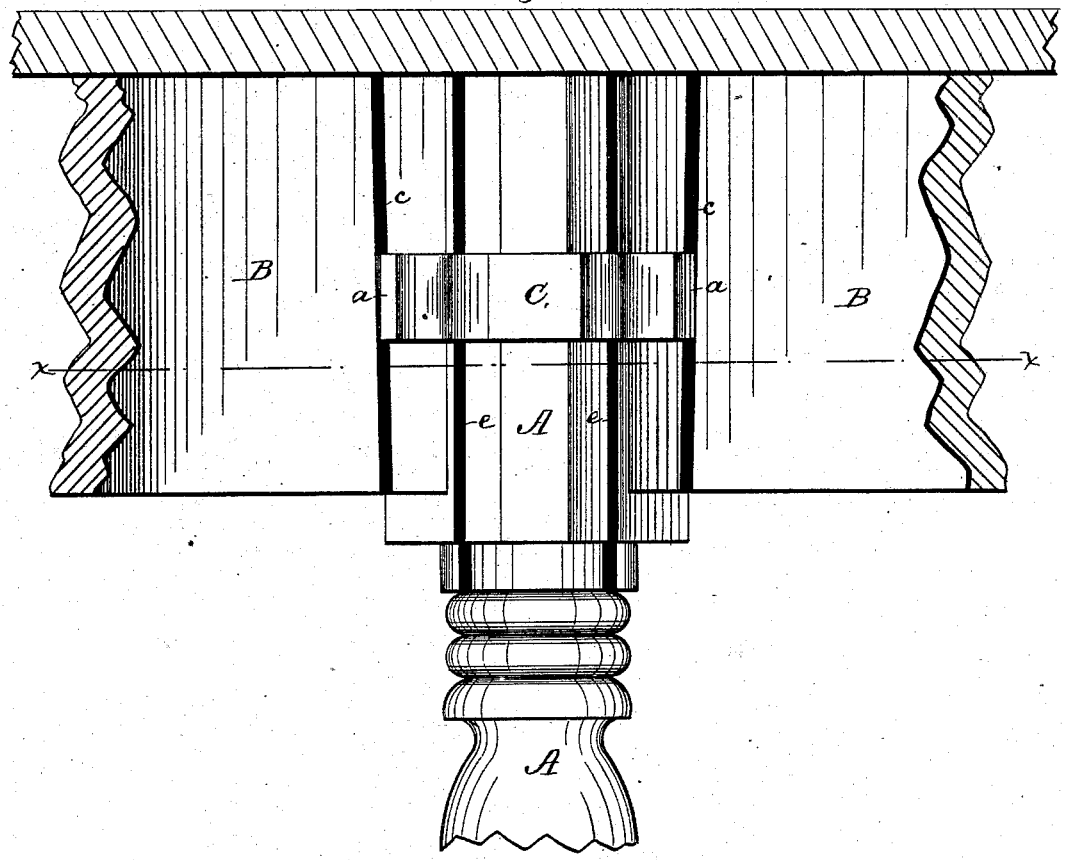
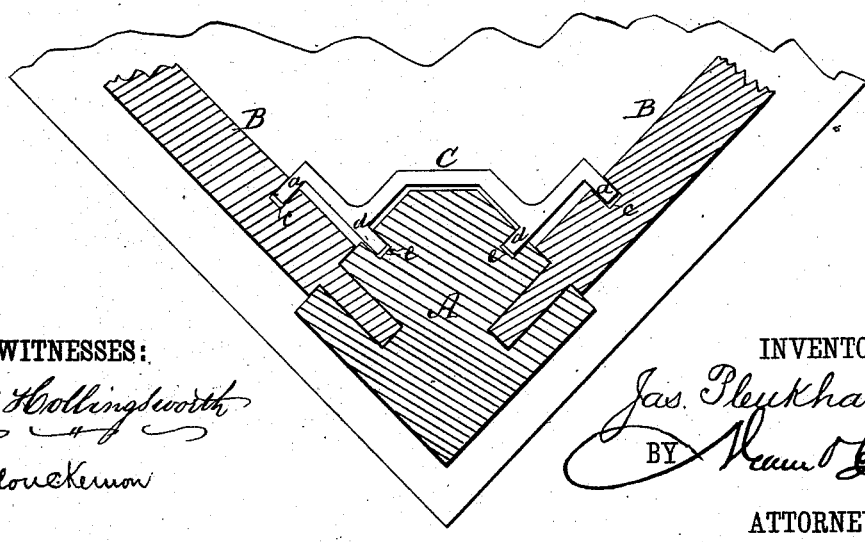
WITNESSES:
W. W. Hollingsworth
Solon E. Kernon
INVENTOR:
Jas. Pleukharp
BY
ATTORNEYS.

UNITED STATES PATENT OFFICE.

JAMES PLEUKHARP, OF COLUMBUS, OHIO.

TABLE.

SPECIFICATION forming part of Letters Patent No. 239,838, dated April 5, 1881.

Application filed August 17, 1880. (No model.)

*To all whom it may concern:*

Be it known that I, JAMES PLEUKHARP, of Columbus, in the county of Franklin and State of Ohio, have invented a new and useful Improvement in Tables; and I do hereby declare that the following is a full, clear, and exact description of the same.

My invention is an improvement in the class of table-frames whose rails and legs are connected by metal clamps having flanges that enter a groove or grooves in the legs.

My improvement consists in providing the legs with vertical grooves which are inclined transversely toward each other, and the rails with grooves that incline toward the legs, and in locking said legs and rails together by means of metal clamps having flanges that enter said grooves, as hereinafter described.

In the accompanying drawings, forming part of this specification, Figure 1 is an inner view of one of the corners of a square table, showing my improvement. Fig. 2 is a horizontal section on line $x$ $x$, Fig. 1.

The legs A and rails B, composing a table-frame, are connected by tenon and mortise joints in the usual way. The device I employ for connecting them is the metal clamp C, which is an oblong cast-iron plate of such angular conformation as adapts it to the inner angles of the legs A and to those formed by the junction of the latter with the rails B. The ends $a$ of the clamp C are bent inward at a right angle to adapt them to enter straight but lengthwise-inclined kerfs or grooves $c$ in the rails B. Upon the inner side of the clamp are formed transverse ribs or flanges $d$, that are transversely inclined toward each other and stand at right angles to the bent ends $a$. These flanges $d$ enter the straight vertically-inclined grooves $e$ in the sides of legs A, and the flanges being also inclined toward each other transversely, the clamps C are prevented from lateral detachment. In other words, the clamps C enable other fastenings to be dispensed with, since they hold the legs A and rails B firmly connected, so that they form a rigid table-frame.

The clamps are applied by driving them into place, and the farther they are driven the more firmly the parts of the frame are forced and held together, which result is due to the fact that the grooves $c$ in the rails B are inclined slightly outward lengthwise from their lower ends, as shown in Fig. 1, so that a wedging action takes place in the operation of driving the clamps. The friction due to the wedging action prevents the clamps sliding downward in the grooves when the wood shrinks, so that they are not liable to become detached accidentally.

In order to "knock down" the table, the clamps C are forced down toward the lower edge of the rails, and thus out of the grooves $c$, and for this purpose any suitable device or instrument may be employed.

When the clamps have been detached the legs A may be drawn out, leaving the rails B alone attached to the table-top. My invention thus secures important advantages in respect to economy of construction, and strength and rigidity of table-frames, and also capability of being easily and quickly put together or knocked down.

Instead of being made of angular shape, the clamp C may be made of a straight or flat oblong plate; but in such case the flanges $d$ require to be made longer to adapt them to enter grooves in the sides of the legs at the requisite distance apart.

What I claim as new is—

The combination of a table-leg having vertical grooves which incline transversely toward each other, rails having grooves which incline toward each other vertically, and a clamp-piece having end flanges which enter the grooves in the rails, and flanges intermediate of its ends, which enter the grooves in the leg, all arranged and operating as set forth.

JAMES PLEUKHARP.

Witnesses:
THOMAS F. GRIFFIN,
ALBERT E. DOMONEY.